United States Patent
Groll

(10) Patent No.: US 7,208,231 B2
(45) Date of Patent: *Apr. 24, 2007

(54) BONDED METAL COMPONENTS HAVING UNIFORM THERMAL CONDUCTIVITY CHARACTERISTICS AND METHOD OF MAKING SAME

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/199,397

(22) Filed: Aug. 8, 2005

(65) Prior Publication Data

US 2005/0271894 A1 Dec. 8, 2005

Related U.S. Application Data

(63) Continuation of application No. 10/608,898, filed on Jun. 27, 2003, now Pat. No. 6,926,971.

(60) Provisional application No. 60/392,312, filed on Jun. 28, 2002.

(51) Int. Cl.
  *B32B 15/18* (2006.01)
  *A47J 36/02* (2006.01)
  *B23K 20/04* (2006.01)

(52) U.S. Cl. ............ 428/653; 428/685; 220/573.1; 220/573.2; 228/155; 228/190; 228/235.3

(58) Field of Classification Search ............... 428/651, 428/652, 660, 685, 615; 220/573.1, 573.2; 228/205, 235.3, 235.2
See application file for complete search history.

(56) References Cited

U.S. PATENT DOCUMENTS

| | | | | |
|---|---|---|---|---|
| 3,340,597 | A * | 9/1967 | Ernst et al. | 228/206 |
| 3,788,513 | A * | 1/1974 | Racz | 428/622 |
| 3,966,426 | A * | 6/1976 | McCoy et al. | 428/653 |
| 4,541,411 | A * | 9/1985 | Woolf | 126/390.1 |
| 4,646,935 | A * | 3/1987 | Ulam | 220/573.1 |
| 5,532,460 | A * | 7/1996 | Okato et al. | 219/621 |
| 5,952,112 | A * | 9/1999 | Spring | 428/653 |
| 6,267,830 | B1 * | 7/2001 | Groll | 148/531 |
| 6,926,971 | B2 * | 8/2005 | Groll | 428/651 |

* cited by examiner

*Primary Examiner*—John J. Zimmerman
(74) *Attorney, Agent, or Firm*—The Webb Law Firm

(57) ABSTRACT

Cookware having improved uniform heat transfer over the entire cross section thereof, the cookware formed from a multi-layered composite metal having a layer of stainless steel roll bonded at or near the core of the composite. The stainless layer is roll bonded to layers of aluminum which, in turn, is roll bonded to layers of stainless steel or aluminum. The layer of stainless steel adjacent to the cooking range may be a ferromagnetic grade of stainless steel if induction-type heating is desired. The cookware may include a non-stick surface applied thereto.

16 Claims, 1 Drawing Sheet

BONDED METAL COMPONENTS HAVING UNIFORM THERMAL CONDUCTIVITY CHARACTERISTICS AND METHOD OF MAKING SAME

CROSS-REFERENCE TO RELATED APPLICATIONS

This is a continuation of co-pending U.S. Pat. application Ser. No. 10/608,898 filed Jun. 27, 2003, now U.S. Pat. No. 6,926,971, issued Aug. 9, 2005, which claims the benefit of U.S. Provisional Patent Application No. 60/392,312 filed Jun. 28, 2002, entitled "Bonded Metal Components Having Uniform Thermal Conductivity Characteristics", and which are incorporated herein in their entirety by reference.

BACKGROUND OF THE INVENTION

1. Field of the Invention

The present invention relates generally to composite bonded metal cookware, griddle plate or a sole plate for an iron and, more particularly, to bonded composite metal cookware, griddle plate or a sole plate for an iron or the like, having at least one inner metal layer possessing a lower coefficient of thermal conductivity than the other metal layers of the composite so as to cause the heat to saturate in that layer prior to being transferred to the cook or ironing surface. In this manner, hot spots in the cook surface or iron are eliminated so as to improve the performance of the appliance and extend the life of a non-stick surface, if present.

2. Description of Related Art

It is well known in the art to manufacture multi-layered, composite bonded metal cookware of a variety of metals, most commonly aluminum and/or copper for good heat conductivity along with outer layers of stainless steel for appearance, wear resistance and corrosion resistance. It is also known to employ a layer of a ferro-magnetic material, such as carbon steel or a 400 series ferritic stainless steel in place of the more common 300 series austenitic stainless steel if the cookware is to be used on an induction cooking device. All of these combinations are disclosed in the prior art as taught, for example, in Ulam U.S. Pat. No. 4,646,935; in McCoy et al. U.S. Pat. No. 3,966,426; and Groll U.S. Pat. No. 6,267,830, all of which are incorporated by reference herein.

It is also well-known in the art to coat the cook surface or ironing sole plate surface with a non-stick material such as PTFE ("Teflon®") or the like. Hot spots may rapidly develop in cookware and sole plates for irons due to the use of conventional metals such as aluminum, copper and stainless steel alone or in composite form. These hot spots not only are troublesome in cooking and ironing but they also cause an accelerated thermal degradation of the non-stick surface. Even if no non-stick surface is present, localized hot spots are undesirable in cookware, since it leads to unequalized cooking.

An attempt to minimize hot spots in cookware is disclosed in U.S. Pat. No. 4,541,411 to Woolf. A multi-ply cookware pan is disclosed by Woolf having inner and outer plies of aluminum or stainless steel enclosing an intermediate ply of a graphite material. The graphite material is not metallurgically bonded to the adjacent metal layers but has thermally anisotropic properties and is oriented so that its thermal conductivity is higher in a plane parallel to the cookware surface than it is in the direction perpendicular to the surface to minimize hot spots on the cooking surface.

Since the graphite layer of Woolf is not metallurgically bonded to the adjacent aluminum and stainless steel layers, and because the aluminum and stainless steel layers are not themselves bonded along the cook surface (due to the intermediate graphite ply), the resultant cookware of Woolf would suffer certain shortcomings. First, due to the non-bonded graphite ply, slight air gaps most probably would be present between the graphite ply and the adjacent layers of aluminum and stainless steel which act as a thermal insulator by way of a barrier or film effect so as to lower the efficiency and uniformity of heat transfer across the interface. In addition, due to the lack of metallurgical bonding between the aluminum and stainless steel layers along the cooking surface of the Woolf cookware, one would expect some thermal warping to occur by virtue of the difference in thermal expansion coefficients of aluminum and stainless steel.

My invention overcomes the problems encountered in the prior art in attempting to eliminate hot spots and achieve more uniform heating across cook surfaces and other applications such as sole plates for ironing (all of which are hereinafter collectively referred to merely as "cookware"). In addition, my invention increases the life of non-stick surfaces by eliminating the hot spot problem of the prior art. Still further, the heat-retardant layer of my invention contributes to the flatness of the cooking vessel during heat-up of multi-layer composites which heretofore might be present due to differences in thermal expansion coefficients of the several layers of different metals in the composite

SUMMARY OF THE INVENTION

Briefly stated, my invention provides composite, bonded metal cookware having outer layers of aluminum and/or stainless steel with a core construction comprising a layer of a heat-retardant metal such as titanium, titanium alloy, stainless steel or the like, bonded on both sides to one of a layer of pure aluminum or a layer of Alclad aluminum. My invention also includes the method of making said bonded components. In one presently preferred construction, a titanium Ti 46 alloy strip having a thickness of about 0.030–0.035 inch is bonded on both surfaces to strips of Alclad aluminum each having a thickness of about 0.035–0.040 inch, with a layer of 304 stainless steel 0.015–0.017 inch bonded to each of the outer surfaces of the Alclad aluminum. Prior to roll bonding, the surfaces of the strips of the above materials are mechanically abraded by wire brush, wheel or the like to clean the surfaces and expose bare, unoxidized metal. The sheets are stacked in the following order: stainless steel layer—Alclad layer—titanium layer (or stainless steel layer)—Alclad layer—stainless steel layer; the stack may then be heated or soaked to a temperature of 550° F.–600° F. in an oxygen-containing atmosphere (regular atmosphere), or at a higher temperature in an O$_2$-free atmosphere furnace. A temperature below about 550° F. fails to provide a Ti bond during rolling, while a temperature above about 600° F. causes the formation of Ti oxides in an oxygen-containing furnace atmosphere. Such oxides prevent sound metallurgical bonding.

The so-heated, ordered stack of sheets is then hot rolled in a first pass in a rolling mill while at 550° F.–600° F. in the oxygen-containing atmosphere at a reduction of at least 5% up to 10% to achieve a bond between the Ti and Al, and between the Al and the outer stainless steel layers. The bonded pack can then be reheated if necessary and rolled in a second pass at a 10–20% reduction. The finished composite is then preferably heat treated at 650° F.–700° F. to improve the bonding strength by way of diffusion bonding between adjacent layers.

The material so processed can then be blanked and formed by way of drawing in a conventional manner into the desired cookware shapes.

Comparative thermographic imaging of the composite material of the present invention indicates a uniformity of heating across the inner cook surface which is free of hot spots.

If induction cookware is desired, a layer of ferro-magnetic material, such as carbon steel of a 400 series ferritic stainless steel, can be applied to the outer (lower) surface of the cookware, i.e., that surface which is closest to the inductor. In addition, a non-stick surface can be applied to the cook surface or iron sole plate surface on the stainless steel layer or, alternatively, along an aluminum layer, if desired.

DETAILED DESCRIPTION OF THE INVENTION

Figure 1:
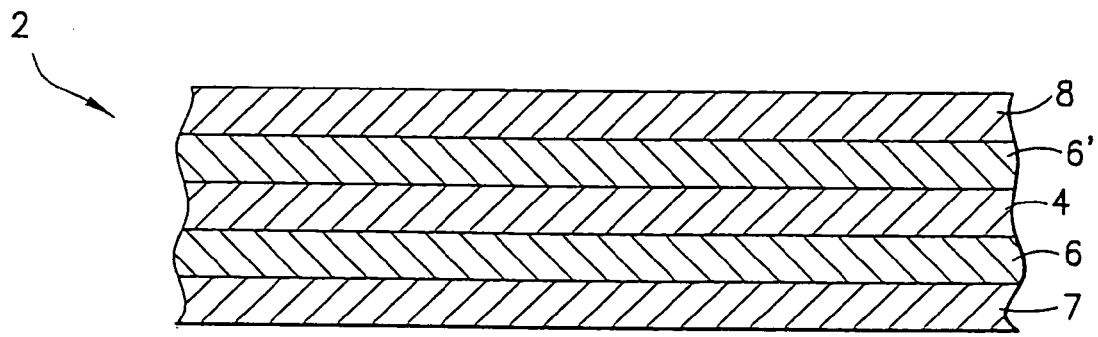
FIG. 1 is a cross-sectional view of one presently preferred embodiment of a bonded metal composite according to the invention.

With reference now to the appended drawings, FIG. 1 schematically depicts, in cross section, one preferred embodiment of a bonded metal composite sheet 2 of the present invention. The composite sheet 2 is a multi-layered, rolled bonded construction comprising a layer 4 of a material having a lower coefficient of thermal conductivity than the other metal layers in the composite sheet 2. The presently preferred material for the lower thermal conductivity layer 4 is titanium or titanium alloy because of its relatively lower heat conductivity coefficient compared with the aluminum coupled with its light weight, which is comparable to aluminum. Stainless steel has a coefficient of heat conductivity similar to that of titanium and may be used for the layer 4. Stainless steel is less expensive than titanium but is heavier, adding to the weight of the cooking vessel. In the composite sheet 2 of FIG. 1, the titanium layer 4 is roll bonded on both sides between aluminum layers 6 and 6'. The aluminum layers 6 and 6' comprise pure aluminum of the 1100 series or the layers 6 and 6' may be Alclad aluminum sheet. Alclad aluminum is made from an aluminum alloy core, such as 3003 alloy, roll bonded to outer layers of pure aluminum. The 3003 aluminum alloy core provides improved strength while the outer layers of pure aluminum provide good roll bonding properties. For improved roll bonding, the titanium layer (or stainless steel) 4 should be bonded to a layer of pure aluminum. It will be understood that when reference is made hereinafter to the titanium layer, that stainless steel could be substituted therefor, as well. The aluminum layers 6, 6' in the embodiment of FIG. 1 are, in turn, roll bonded to layers 7 and 8 of stainless steel.

The stainless steel layer 8 defines the inner cook surface of the composite sheet 2 of FIG. 1 and is preferably made from an austenitic stainless steel such as type 304 stainless steel which offers good corrosion resistance and deep drawing properties. The outer stainless steel layer 7 is directly adjacent to the heat source and may also be made from an austenitic grade of stainless steel such as 304 or from aluminum (brushed, polished or anodized). If the cookware is to be used for induction type cooking, then the outer layer 7 is made from a ferromagnetic material, such as carbon steel or from a ferritic stainless steel, or from a composite containing a ferritic stainless steel or carbon steel. A presently preferred ferritic stainless steel for use in layer 8 is selected from the 400 series of stainless steels such as type 409 stainless steel. A roll bonded composite comprising a layer of a 400 series ferritic stainless steel sandwiched between layers of 300 series austenitic stainless steel may also be used for layer 8 when the cooking vessel is intended for use with an induction cooking range. Of course, such induction cookware can also be used with conventional gas or electric ranges.

Figure 2:
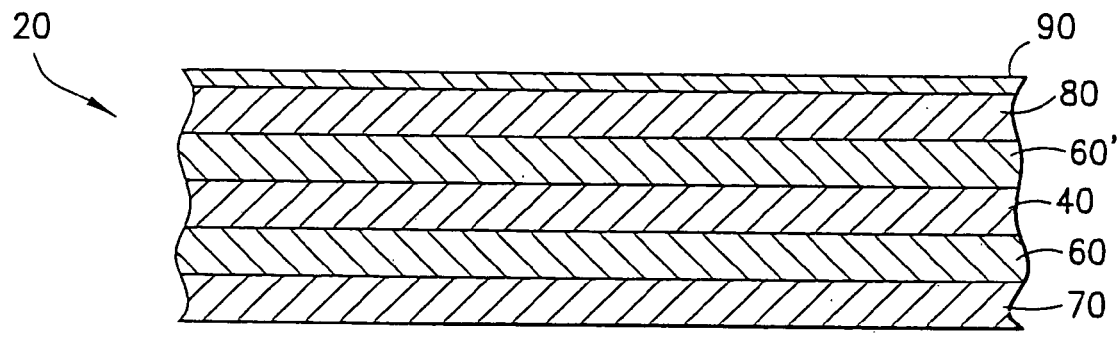
FIGS. 2–3 are cross-sectional views of other presently preferred embodiments of the invention similar to FIG. 1.
Figure 3:
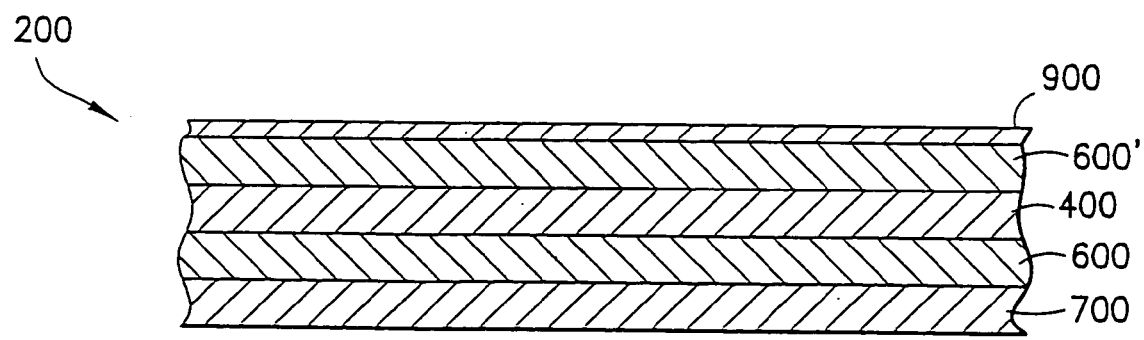

Additional presently preferred embodiments of my invention are depicted in FIGS. 2 and 3 wherein the roll bonded composite sheets of my invention are identified by reference numerals 20 and 200, respectively. In the one presently preferred embodiment of FIG. 2, the roll bonded composite sheet 20 comprises a layer of titanium or titanium alloy 40 roll bonded to layers 60 and 60' of aluminum or Alclad aluminum which, in turn, are roll bonded to layers of stainless steel 70 and 80. The lower layer 70 may be one of austenitic or ferritic stainless steel or a composite, i.e., a layer 70 of ferritic stainless steel with a further outer layer of austenitic stainless steel (not shown) roll bonded thereto, all as described above with reference to FIG. 1 and composite sheet 2.

The layer 90 of FIG. 2 defines the cook surface and is a non-stick surface such as a Teflon®-brand PTFE or the like. Other surfaces such as TiN or ZrN ceramic nitride non-stick surfaces as disclosed in U.S. Pat. No. 6,360,423 to Groll, or a diamond surface applied by laser as disclosed in U.S. Pat. No. 5,731,046 of Mistic et al. may also be employed as surface 90. These patents are incorporated by reference herein. The non-stick surface may be applied to the stainless steel layer 80 or, alternatively, directly to the aluminum layer 60' in which case stainless layer 80 would be omitted as described below with reference to FIG. 3.

A further presently preferred embodiment of the invention is depicted as roll bonded composite metal sheet 200 in FIG. 3. In this embodiment a layer of titanium or titanium alloy 400 is roll bonded to layers 600 and 600' of pure aluminum or Alclad aluminum. The layer 600' of aluminum or Alclad aluminum which is adjacent to the cook surface is coated with a layer 900 of non-stick material, as described above, applied thereto. The lower surface of the composite 200 closest to the heat source of the cooking range receives a layer 700 of austenitic or ferritic stainless steel. Alternatively, the outermost layer 700 may be a layer of roll bonded aluminum preferably having an anodized outer surface for scratch resistance and improved appearance.

In all of the embodiments of the roll bonded composites 2, 20 and 200 discussed above, the respective titanium layers 4, 40 and 400 (or stainless steel layers) act to retard the heat transfer from the heat source acting as surfaces 7, 70 and 700 to the cook surfaces 8, 90 and 900. The titanium layers 4, 40 and 400 act as a "heat dam" or thermal buffer and cause the temperature to conduct laterally or radially, as opposed to perpendicularly through the aluminum layers 6, 60 and 600. The heat is not conducted directly through the aluminum layers as in conventional composite cookware by virtue of the titanium layers. In this manner, the present invention prevents the occurrence of hot spots on the cooking surface. The titanium layer, by virtue of its lower coefficient of thermal conductivity, acts as a thermal buffer and allows the heat to become more uniform along a radial direction in the aluminum layers 6, 60 and 600 and then permits the heat to transfer by conduction uniformly through the aluminum layers 6', 60' and 600' to the cooking surface. In addition to avoiding hot spots along a horizontal cook surface, the titanium layers 4, 40 and 400 provide for uniform temperature distribution along the vertical sidewall of a deep drawn pot or pan since the titanium layers form an integral part of the composite sheet 2, 20 and 200 which is used to draw the cookware.

Titanium is an ideal layer for the thermal buffer or heat dam layers 4, 40 and 400 in cookware manufacture because titanium has a relatively low density, comparable to aluminum, and, thus, does not add appreciable weight to the cookware. In addition, titanium roll bonds well to the aluminum and stainless steel layers and has a coefficient of thermal expansion which is compatible with the other metals of the composite sheet 2, 20 and 200 so that thermally induced warping of the cookware is avoided.

Roll bonding the titanium layer 4, 40 and 400 to the adjacent aluminum layers 6 and 6', 60 and 60', and 600 and 600' assures a metallurgically continuous bond across the entire composite (free of air gaps). Accordingly, the thermal transfer/conductivity across the bonded interfaces between the aluminum layers 6, 60 and 600 and the titanium layers 4, 40 and 400 and, thence, between the titanium layers 4, 40 and 400 and the respective aluminum layers 6', 60' and 600' is uniform.

By way of example, and in no way limiting the scope of my invention, the composite sheet 2 of FIG. 1 may be made as follows. A pure titanium or titanium alloy sheet such as a Ti—Al alloy, designated Ti-46 alloy, of about 0.035 inch thick is provided to form layer 4. Both surfaces of the Ti sheet forming layer 4 are mechanically abraded using a wire brush or wheel or the like to expose the bare unoxidized metal. Two sheets of Alclad aluminum forming layers 6 and 6' having a thickness of between 0.035–0.040 inch are also abrasively or wire wheel ground or abraded to expose the underlying unoxidized pure aluminum and placed on both sides of the titanium. The sheets 7 and 8 of type 304 stainless steel having a thickness of about 0.015–0.017 inch are conditioned, cleaned and placed on either side of the Alclad aluminum layers 6 and 6', respectively. The stacked array of layers 7, 6, 4, 6' and 8 is then heated in a regular atmosphere oven or furnace (containing atmospheric $O_2$) and heated to a temperature of between about 550° F. to 600° F. so that the stacked array is uniformly soaked within that temperature range. A temperature of below about 550° F. will provide an inadequate roll bond while a temperature in excess of about 600° F. causes the formation of Ti-oxide (in an $O_2$ furnace atmosphere) which also proves detrimental to roll bonding. Of course, if the heating and rolling is conducted in an $O_2$ free atmosphere or environment, then preheating and rolling can be conducted at temperatures in excess of 600° F. Such $O_2$ free atmospheres or environments, however, add to the expense of the process, which may be commercially unattractive.

The stacked array of sheets comprising layers 7, 6, 4, 6' and 8 is preheated within a temperature range of 550° F. to 600° F. and then immediately rolled (also in an $O_2$ atmosphere) in a rolling mill in a first rolling pass of 5–10% reduction to effect a bond between the layers of the array. The once hot rolled array is then subjected to a second hot roll pass through the rolling mill at a further reduction of between 10–20%. The thus rolled array is then at the desired finish thickness of about 0.100 inch, for example, and returned to a furnace for a thermal treatment at 650–700° F. for about 4–8 minutes to improve the diffusion bonding between the adjacent layers. This treatment causes a greater interatomic sharing of electrons between adjacent layers to provide excellent bond integrity, uniformity and strength.

The roll bonded composite 2 is then processed in a conventional manner to make cookware of desired configurations and sizes. The well-known manufacturing steps for making cookware involves the conventional steps of blanking, drawing, buffing and the like and are in and of themselves well-known in the metal working art.

The above-described layers 4, 40 and 400 forming the thermal buffer or heat dam, as mentioned, preferably consist of titanium, titanium alloy or stainless steel. The type of stainless steel is not particularly limited and may be either a ferritic grade or an austenitic grade, for example, of the 400 or 300 series, respectively, which offer good formability. The ferritic grades, having ferromagnetic properties, are also advantageous if the cooking utensil is to be used in connection with an induction heating range. Still other metals may also be used as the head dam or thermal buffer layer 4, 40 or 400 as long as the other metal has a coefficient of thermal conductivity lower than the other high heat conductivity layer.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The Invention claimed is:

1. Cookware formed from a multi-layered composite sheet having improved uniform thermal transfer properties, said composite sheet comprising a plurality of roll bonded metal layers consisting of a core layer of stainless steel, roll bonded on both sides to immediately adjacent layers of pure aluminum or Alclad aluminum, inner and outer layers of stainless steel roll bonded to the layers of pure aluminum or Alclad aluminum, said core layer having a coefficient of thermal conductivity lower than said immediately adjacent aluminum layers whereby said core layer retards heat flow in a transverse direction to cause said core layer to distribute heat in a lateral direction to provide uniform heating across a cook surface of said cookware and wherein the outer layer of stainless steel is a ferromagnetic stainless steel whereby the cookware may be heated by induction.

2. A method of making cookware made from a multi-layered composite metal sheet comprising the steps of:
   (a) providing a plurality of metal sheets including a first layer of stainless steel defining a cooking surface, a core layer comprising at least one sheet of stainless steel and first and second sheets selected from the group consisting of pure aluminum and Alclad aluminum facing said stainless steel core layer, a further sheet of a metal consisting of ferromagnetic stainless steel;
   (b) preparing said metal sheets by removing an oxide surface layer from surfaces thereof;
   (c) stacking said metal sheets to form an ordered array such that stainless steel core layer is sandwiched between the pure aluminum or Alclad aluminum sheets and the first sheet of stainless steel and the further sheet of ferromagnetic stainless steel faces one of the pure aluminum or Alclad aluminum sheets on opposite sides thereof;
   (d) heating said ordered array to a uniform rolling temperature;

(e) rolling said ordered array to a desired thickness to form a roll bonded composite sheet; and (f) drawing said roll bonded composite to form cookware of a desired configuration comprising in an ordered array: a cooking surface formed by the layer of stainless steel, a layer of pure aluminum or Alclad aluminum, a thermal barrier layer of stainless steel, a layer of pure aluminum or Alclad aluminum and a layer of ferromagnetic stainless steel forming the outer surface of said cookware.

3. The method of claim 2 wherein the metal sheets provided in step (a) include at least two sheets of Alclad aluminum which are stacked in step (c) on opposed sides of said core layer.

4. A method of making cookware made from a multi-layered composite metal sheet comprising the steps of:
   (a) providing a plurality of metal sheets including a core layer comprising at least one sheet of stainless steel and at least two sheets selected from the group consisting of pure aluminum and Alclad aluminum;
   (b) preparing said metal sheets by removing an oxide surface layer from surfaces thereof;
   (c) stacking said metal sheets in an ordered array such that adjacent sheets having surfaces prepared from step (b) are facing each other and wherein the stainless steel sheet is sandwiched between the pure aluminum or Alclad aluminum sheets and forms a core layer of the ordered array;
   (d) heating said ordered array in a furnace or oven containing atmospheric oxygen to a uniform rolling temperature of between 550° to 600° F;
   (e) rolling said ordered array to a desired thickness to form a roll bonded composite sheet; and
   (f) forming said roll bonded composite sheet into cookware of a desired configuration.

5. A method of making the cookware of claim 4 wherein the rolling step (e) comprises a first rolling reduction of at least 5% to about 10% followed by reheating to about 550°–600° F, rolling a second pass, and thereafter heat treating at about 650°–700° F to improve bonding strength in the multi-layered composite metal sheet.

6. The method of claim 4, including the step of applying a non-stick layer to a cook surface of the cookware.

7. Cookware made from a bonded metal composite comprising:
   (a) at least one core layer of stainless steel;
   (b) upper and lower layers consisting of pure aluminum or Alclad aluminum, each layer roll bonded to upper and lower sides of said core layer;
   (c) a further layer of stainless steel roll bonded to the upper layer of the pure aluminum or Alclad aluminum to define a cook surface of said cookware; and
   (d) a further layer of stainless steel or aluminum roll bonded to the lower layer of pure aluminum or Alclad aluminum to define an outer surface of said cookware, wherein the further layer of stainless steel is one of austenitic or ferritic stainless steel.

8. The cookware of claim 7, wherein the further layer (d) defining the outer surface of said cookware is ferritic stainless steel to provide for induction heating.

9. The cookware of claim 7 wherein the further layer (c) of stainless steel defining the cook surface has a non-stick layer applied thereto.

10. The cookware of claim 7 wherein the further layer (d) defining the outer surface is austenitic stainless steel.

11. The cookware of claim 7 wherein the further layer (d) defining the outer surface is stainless steel having a brushed surface finish.

12. The cookware of claim 7 wherein the further layer (d) defining the outer surface is aluminum.

13. The cookware of claim 12 wherein the further layer (d) of aluminum defining the outer surface has an anodized finish.

14. Cookware made from a bonded metal composite comprising:
   (a) at least one core layer of stainless steel;
   (b) upper and lower layers consisting of pure aluminum or Alclad aluminum, each layer roll bonded to upper and lower sides of said core layer;
   (c) a further layer of stainless steel roll bonded to the upper layer of the pure aluminum or Alclad aluminum to define a cook surface of said cookware and having a non-stick layer applied thereto; and
   (d) a further layer of stainless steel of a ferritic type roll bonded to the lower layer of pure aluminum or Alclad aluminum to define an outer surface of said cookware, wherein the further layer of ferritic stainless steel has a brushed finish.

15. Cookware made from a bonded metal composite comprising:
   (a) at least one core layer of stainless steel;
   (b) upper and lower layers consisting of pure aluminum or Alclad aluminum, each layer roll bonded to upper and lower sides of said core layer;
   (c) a further layer of stainless steel roll bonded to the upper layer of the pure aluminum or Alclad aluminum to define a cook surface of said cookware and having a non-stick layer applied thereto; and
   (d) a further layer of stainless steel of an austenitic type roll bonded to the lower layer of pure aluminum or Alclad aluminum to define an outer surface of said cookware, wherein the further layer of austenitic stainless steel has a brushed finish.

16. Cookware made from a bonded metal composite comprising:
   (a) at least one core layer of stainless steel;
   (b) upper and lower layers consisting of pure aluminum or Alclad aluminum, each layer roll bonded to upper and lower sides of said core layer;
   (c) a further layer of stainless steel roll bonded to the upper layer of the pure aluminum or Alclad aluminum to define a cook surface of said cookware and having a non-stick layer applied thereto; and
   (d) a further layer of aluminum roll bonded to the lower layer of pure aluminum or Alclad aluminum to define an outer surface of said cookware, wherein the further layer of aluminum has an anodized finish.

* * * * *